US007894462B2

(12) United States Patent
Uttaro et al.

(10) Patent No.: US 7,894,462 B2
(45) Date of Patent: Feb. 22, 2011

(54) BOUNDARY ROUTERS PROVIDING REDISTRIBUTION AND RELATED BACKBONE NETWORKS, COMPUTER PROGRAM PRODUCTS, AND METHODS

(75) Inventors: James Uttaro, Staten Island, NY (US); Maria Napierala, Ocean, NJ (US); Jeewan Ramsaroop, Edison, NJ (US); Richard Todd Harding, Hoschton, GA (US); Hui Tong, Princeton, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 33 days.

(21) Appl. No.: 12/344,855

(22) Filed: Dec. 29, 2008

(65) Prior Publication Data

US 2010/0166001 A1 Jul. 1, 2010

(51) Int. Cl.
*H04L 12/56* (2006.01)
(52) U.S. Cl. .................. 370/401; 370/402; 370/396
(58) Field of Classification Search .................. 370/254, 370/255, 238, 351, 352, 354, 389, 392, 401, 370/390, 432, 536; 709/238, 242
See application file for complete search history.

(56) References Cited

U.S. PATENT DOCUMENTS

| 5,159,685 | A | 10/1992 | Kung |
| 5,483,637 | A | 1/1996 | Winokur et al. |
| 6,662,221 | B1 | 12/2003 | Gonda et al. |
| 6,781,959 | B1 | 8/2004 | Garakani et al. |
| 7,010,718 | B2 | 3/2006 | Ogawa et al. |
| 7,257,741 | B1 | 8/2007 | Palenik et al. |
| 7,420,927 | B1 | 9/2008 | Garakani et al. |
| 2003/0065967 | A1 | 4/2003 | Garcia et al. |
| 2004/0042396 | A1* | 3/2004 | Brown et al. ................ 370/227 |
| 2004/0066747 | A1 | 4/2004 | Jorgensen et al. |
| 2005/0050096 | A1 | 3/2005 | Gomes et al. |

(Continued)

OTHER PUBLICATIONS

Moy, RFC2328, "OSPF Version 2" Ascend Communications, Inc., pp. 1-244, (1998).

(Continued)

*Primary Examiner*—Pankaj Kumar
*Assistant Examiner*—Anez Ebrahim
(74) *Attorney, Agent, or Firm*—Myers Bigel Sibley & Sajovec

(57) ABSTRACT

A backbone network may include first and second border routers and a route reflector. The first border router may provide data connectivity between the backbone network and a first regional network. The first border router may be configured to receive a notification of a change in status of an edge router of the first regional network, and the notification may be received according to a first routing protocol. The first border router may be further configured to redistribute the notification of the change in status of the edge router from the first routing protocol to a second routing protocol with the first and second routing protocols being different. The second border router may provide data connectivity between the backbone network and a second regional network. The route reflector may be coupled between the first and second border routers, and the route reflector may be configured to transfer the redistributed notification from the first border router to the second border router. Related routers, methods, and computer program products are also discussed.

18 Claims, 4 Drawing Sheets

U.S. PATENT DOCUMENTS

| | | | |
|---|---|---|---|
| 2005/0213558 A1* | 9/2005 | Levit et al. | 370/351 |
| 2006/0029075 A1 | 2/2006 | Sheppard et al. | |
| 2006/0075094 A1 | 4/2006 | Wen et al. | |
| 2006/0198310 A1 | 9/2006 | Stieglitz et al. | |
| 2007/0214275 A1* | 9/2007 | Mirtorabi et al. | 709/230 |
| 2008/0159154 A1 | 7/2008 | Bajpay et al. | |
| 2010/0080222 A1* | 4/2010 | Mohapatra et al. | 370/392 |

OTHER PUBLICATIONS

"Open Shortest Path First v3" Cisco Systems, pp. 1-93, (2002).

Rekhter et al., RFC1771, "A Border Gateway Protocol 4" retrieved from http://www.faqs.org/rfcs.rfc1771.html, pp. 1-51, (1995).

Coltum et al., RFC5340, "OSPF for IPv6" retrieved from http://www.faqs.org/rfcs.rfc5340.html, pp. 1-84, retrieved Nov. 13, 2008.

Definition of OSPF retrieved from http://searchtelecom.techtarget.com/sDefinition/0,,sid103_gci212728,00.html ,pp. 1-2, retrieved on Nov. 13, 2008.

"EIGRP to OSPF Migration Strategies" Juniper Networks, Inc., pp. 1-9 (2005).

McQuerry "Implementing EIGRP", Cisco Press, Jun. 11, 2008, retrieved from http://www.ciscopress.com/articles/article.asp?p=1171169&seqNum=3, 7 pages, retrieved on Dec. 9, 2008.

OSPF Database Explanation Guide, Document ID 16437, Aug. 10, 2005.

"Open Shortest Path First" Wikipedia, retrieved from http://en.wikipedia.org/wiki/Open_Shortest_Path_First, retrieved Nov. 13, 2008, pp. 1-13.

"Open Shortest Path First (OSPF)", Introduction, Cisco Systems, retrieved from http://www.cisco.com/en/US/tech/tk365/tk480/tsd_technology_support_sub-protocol_ho . . . , 4 pages, retrieved on Nov. 13, 2008.

Rekhter "RFC 1771—A Border Gateway Protocol 4 (BGP-4)" retrieved from http://www.faqs.org/rfcs/rfc1771.html, Nov. 21, 2008, pp. 1-51.

Shamim, "What Does the show ip ospf neighbor Command Reveal?" Cisco, Document ID 13688, Aug. 8, 2005, pp. 1-3.

Shamin, "What Does the show ip ospf interface Command Reveal?" Cisco, Document ID 13689, Aug. 10, 2005, pp. 1-6.

"Troubleshooting EIGRP" retrieved from http://www.cisco.com/en/US/tech/tk365/technologies_tech_note09186a0080094613.shtml, 8 pages retrieved on Dec. 9, 2008.

* cited by examiner

US 7,894,462 B2

BOUNDARY ROUTERS PROVIDING REDISTRIBUTION AND RELATED BACKBONE NETWORKS, COMPUTER PROGRAM PRODUCTS, AND METHODS

BACKGROUND

The present disclosure relates generally to the field of networks, and more particularly, to network routers and related computer program products and methods.

Enterprise customers are increasingly adopting multiprotocol label switching (MPLS) based virtual private network (VPN) services to implement communications networks among their respective customer sites using a service provider's network. Such MPLS-based VPN's may provide direct any-to-any reachability among an enterprise's customer sites. An enterprise customer may, for example, deploy Voice over Internet Protocol (VoIP) services and/or local area network (LAN) based data services to their customer sites via their respective VPN. For example, the Open Shortest Path First (OSPF) routing protocol is a dynamic routing protocol that is used in Internet Protocol (IP) networks. The OSPF routing protocol is discussed, for example, in the white paper published by Juniper Networks, Inc. entitled "EIGRP to OSPF Migration Strategies," pages 1-9, 2005.

SUMMARY

It should be appreciated that this summary is provided to introduce a selection of concepts in a simplified form, the concepts being further described below in the Detailed Description. This summary is not intended to identify key features or essential features of this disclosure, nor is it intended to limit the scope of the invention.

According to some embodiments, a backbone network may include first and second border routers and a route reflector. The first border router may provide data connectivity between the backbone network and a first regional network. The first border router may be configured to receive a notification of a change in status of an edge router of the first regional network, and the notification may be received according to a first routing protocol. The first border router may be further configured to redistribute the notification of the change in status of the edge router from the first routing protocol to a second routing protocol with the first and second routing protocols being different. The second border router may provide data connectivity between the backbone network and a second regional network. The route reflector may be coupled between the first and second border routers, and the route reflector may be configured to transfer the redistributed notification from the first border router to the second border router.

According to some other embodiments, a border router of a backbone network may include a router controller coupled between first and second router interfaces, and a database associated with the first router interface. The first router interface may provide a data coupling with a regional data network outside the backbone network, and the first network interface may be configured to receive a notification of a change in status of an edge router of the regional network with the notification being received according to a first routing protocol. The database may be associated with the first router interface, and the database may be provided according to the first routing protocol. Moreover, the first router interface may be configured to update the interface based on the change in status of the edge router responsive to receiving the notification of the change in status of the edge router of the regional network. The second router interface may provide a data coupling with another border router of the backbone network. The router controller may be configured to redistribute the notification of the change in status of the edge router from the first routing protocol to a second routing protocol with the first and second routing protocols being different. The router controller may also be configured to provide the redistributed notification to the second router interface.

According to still other embodiments, a method may be provided for operating a border router of a backbone network providing data connectivity between the backbone network and a regional network. The method may include receiving a notification of a change in status of an edge router of the regional network at an interface of the border router of the backbone network that is coupled to the regional network, and the notification may be received according to a first routing protocol. Responsive to receiving the notification of the change in status of the edge router of the regional network, a database associated with the interface of the border router coupled to the regional network may be updated. More particularly, the database may be provided according to the first routing protocol, and the database may be updated based on the change in status of the edge router. Responsive to receiving the notification of the change in status of the edge router of the regional network, the notification of the change in status of the edge router may be redistributed from the first routing protocol to a second routing protocol with the first and second routing protocols being different.

According to yet other embodiments, a method may be provided for operating a backbone network including a first border router providing data connectivity between the backbone network and a first regional network and a second border router providing data connectivity between the backbone network and a second regional network. The method may include receiving a notification of a change in status of an edge router of the first regional network at the first border router of the backbone network that is coupled to the regional network with the notification being received according to a first routing protocol. Responsive to receiving the notification of the change in status of the edge router of the first regional network at the first border router, the notification of the change in status of the edge router may be redistributed from the first routing protocol to a second routing protocol with the first and second routing protocols being different. Responsive to redistributing the notification, the redistributed notification may be transmitted from the first border router to the second border router.

According to more embodiments, a computer program product may be configured to operate a border router of a backbone network providing data connectivity between the backbone network and a regional network, and the computer program product may include a computer useable storage medium having computer-readable program code embodied in the medium. The computer-readable program code may include computer-readable program code that is configured to receive a notification of a change in status of an edge router of the regional network at an interface of the border router of the backbone network that is coupled to the regional network with the notification being received according to a first routing protocol. The computer-readable program code may also include computer-readable program code that is configured to update a database associated with the interface of the border router coupled to the regional network responsive to receiving the notification of the change in status of the edge router of the regional network, with the database being provided according to the first routing protocol and with the database being updated based on the change in status of the edge router. In addition, the computer-readable program code may include computer-readable program code that is configured to redistribute the notification of the change in status of the edge router from the first routing protocol to a second routing protocol responsive to receiving the notification of the change in status of the edge router of the regional network, with the first and second routing protocols being different.

According to still more embodiments, a computer program product may be configured to operate a backbone network including a first border router providing data connectivity between the backbone network and a first regional network and a second border router providing data connectivity between the backbone network and a second regional network. The computer-readable program code may include computer-readable program code that is configured to receive a notification of a change in status of an edge router of the first regional network at the first border router of the backbone network that is coupled to the regional network with the notification being received according to a first routing protocol. The computer-readable program code may also include computer-readable program code that is configured to redistribute the notification of the change in status of the edge router from the first routing protocol to a second routing protocol responsive to receiving the notification of the change in status of the edge router of the first regional network at the first border router, with the first and second routing protocols being different. In addition, the computer-readable program code may include computer-readable program code that is configured to transmit the redistributed notification from the first border router to the second border router responsive to redistributing the notification.

Other systems, methods, and/or computer program products will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

Figure 1:
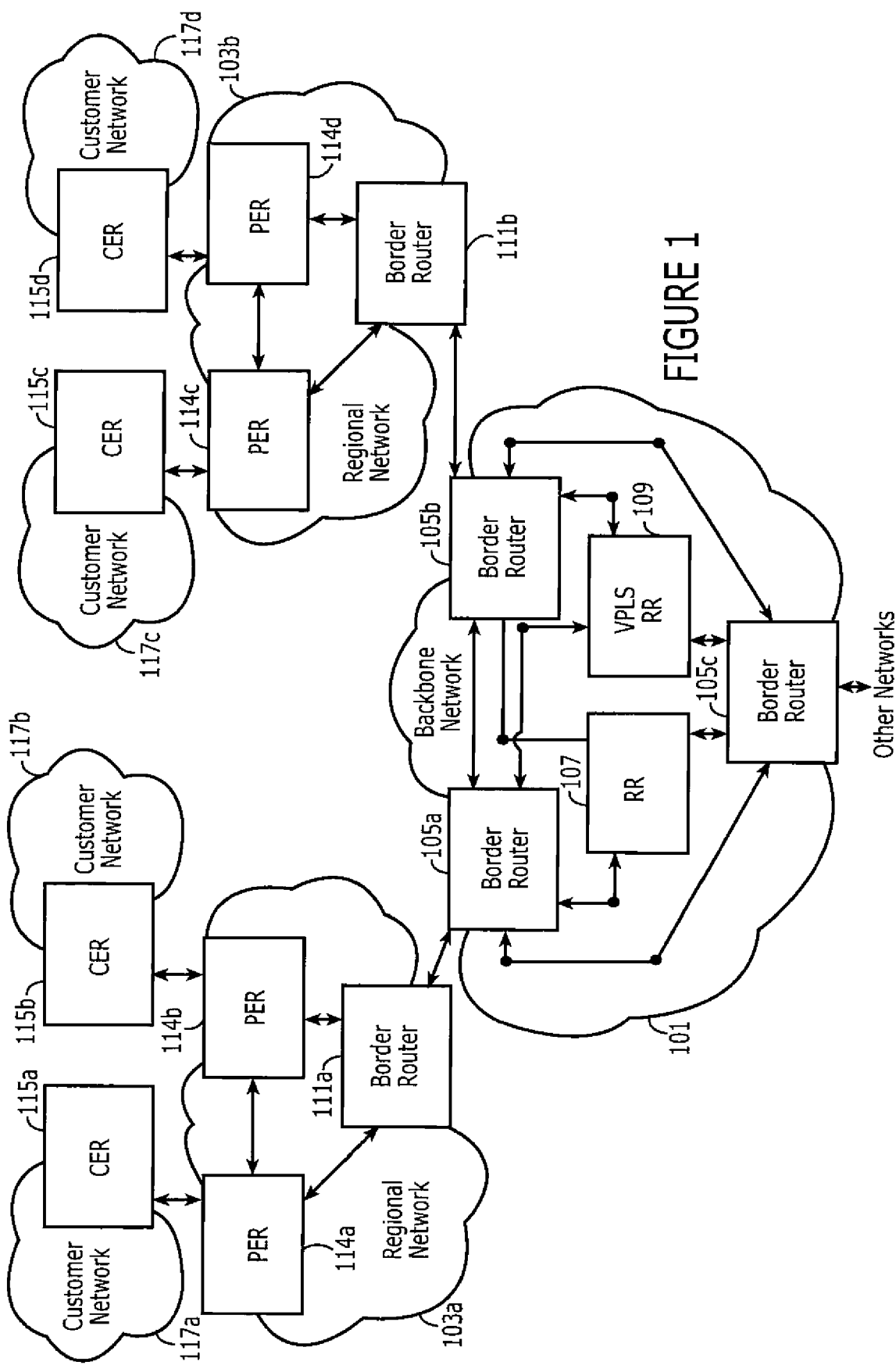
FIG. 1 is a block diagram illustrating embodiments of backbone networks providing redistribution.

Illustrative embodiments will be described more fully hereinafter with reference to the accompanying drawings. Embodiments may, however, be provided in many different forms and should not be construed as limited to the embodiments set forth herein; rather, these embodiments are provided so that this disclosure will be thorough and complete, and will fully convey the scope of this disclosure to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first network element (such as a first router) could be termed a second network element, and, similarly, a second network element (such as a second router) could be termed a first network element without departing from the teachings of the disclosure.

Unless otherwise defined, all terms (including technical and scientific terms) used herein have the same meaning as commonly understood by one of ordinary skill in this art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, embodiments may be provided as methods, computing systems, and/or computer program products. Accordingly, embodiments may take the form of an entirely hardware embodiment, an entirely software embodiment (including firmware, resident software, micro-code, etc.) or an embodiment combining software and hardware aspects. Furthermore, embodiments may take the form of a computer program product comprising a computer-usable storage medium having computer-usable program code embodied in the medium. Any suitable computer readable medium may be utilized including hard disks, CD-ROMs, optical storage devices, or magnetic storage devices. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or medium. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Computer program code for carrying out operations of embodiments may be written, for example, in an object oriented programming language such as JAVA®, Smalltalk, and/or C++. However, the computer program code for carrying out operations of embodiments may also be written in conventional procedural programming languages, such as the "C" programming language or in a visually oriented programming environment, such as VisualBasic.

Embodiments are described in part below with reference to block diagrams of methods, systems and/or computer program products. It will be understood that each block of the illustrations, and combinations of blocks, can be implemented by computer program instructions. These computer program instructions may be provided to a processor of a general purpose computer, special purpose computer, or other programmable computing apparatus to produce a machine, such that the instructions, which execute via the processor of the computer or other programmable computing apparatus, create means for implementing the functions/acts specified in the block or blocks.

These computer program instructions may also be stored in a computer-readable memory that can direct a computer or other programmable computing apparatus to function in a particular manner, such that the instructions stored in the computer-readable memory produce an article of manufacture including instruction means which implement the function/act specified in the block or blocks.

The computer program instructions may also be loaded onto a computer or other programmable computing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 is a block diagram illustrating embodiments of methods, systems, and computer program products that may be used by a network service provider to provide network services using a plurality of distributed regional networks (such as Metro-Networks or MetroNets) 103a and 103b that are all coupled through a same backbone network (such as common backbone or CBB network) 101 using Internet Protocol (IP). Moreover, updates of router address information (such as OSPF LoopBacks or LBs) across the plurality of regional networks (e.g., MetroNets) 103a and 103b coupled though the backbone network (e.g., CBB network) 101 may be provided while reducing a burden on backbone (e.g., CBB) network 101.

As shown in FIG. 1, backbone network 101 may include a plurality of border routers (e.g., Autonomous System Border Routers or ASBRs) 105a, 105b, and 105c, Route Reflector (RR) 107, and Virtual Private LAN Service Route Reflector (VPLS RR) 109. Moreover, each of the border routers 105a, 105b, and 105c may be coupled to respective border routers 111a and 111b of regional networks 103a and 103b. While backbone network 101 is shown with three border routers 105a-c coupled to regional networks 103a-b for purposes of illustration, backbone network 101 may include any number border routers coupled to any number of regional networks. Moreover, backbone network 101 may be a Multi-Protocol Label Switching (MPLS) CBB network. Each regional network 103a-b may include a plurality of Provider Edge Routers (PERs) 114a, 114b, 114c, and 114d coupled to respective Customer Edge Routers (CERs) 115a, 115b, 115c, and 115d supporting respective customer networks 117a, 117b, 117c, and 117d.

A same network service provider may thus operate backbone network 101 and regional networks 103a-b to provide network service for customer networks 117a-d. More particularly, backbone network 101 and regional networks 103a-b may be configured to support the Open Shortest Path First (OSPF) routing protocol for services such as Virtual Private Network (VPN) and/or Virtual Private Local Area Network Service (VPLS) (collectively referred to as virtual network services) between different customer networks 117a-d coupled to the same or different regional networks 103a-b. The OSPF routing protocol can learn least/reduced cost routes from neighboring OSPF routers and route IP traffic in a shortest/reduced path to its destination. Each OSPF router may thus maintain an identical OSPF database (also referred to as a Link State or LS database) at each interface thereof and may build an SPF (shortest path first) tree based on a shortest path first algorithm. Accordingly, OSPF routing may be relatively complicated because it depends on formation of adjacencies, databases, and sophisticated network configurations. The OSPF routing protocol is discussed, for example, by J. Moy in "Request For Comments: OSPF Version 2," Request For Comments (RFC) 2328, pages 1-244, April 1998; and by R. Coltun et al. in "Request For Comments: OSPF for IPv6," Request For Comments (RFC) 5340, pages 1-84, July 2008. The disclosures of both of these references are hereby incorporated herein in their entireties by reference.

More particularly, the OSPF routing protocol may be used to provide virtual network service couplings between different customer locations. For example, a first OSPF link may provide a virtual network link between customer networks 117a and 117c operated by a same customer in different locations. More particularly, the OSPF link may be provided between CERs 115a and 115c using PER 114a, border router 111a, border router 105a, border router 105b, border router 111b, and PER 114c. A second OSPF link may provide a virtual network link between customer networks 117b and 117d operated by a same customer in different locations. More particularly, the second OSPF link may be provided between customer edge routers CER 115b and CER 115d through routers PER 114b, border router 111a, border router 105a, border router 105b, border router 111b, and PER 114d. Because each router in a network supporting the OSPF routing protocol may maintain an identical OSPF database including router address information (e.g., LoopBacks or LBs) for all routers in the combined network (including backbone network 101 and all regional networks 103a-b) and all OSPF links through the combined network, it may be difficult to maintain OSPF databases for all interfaces of all border routers of backbone network 101 with an addition of a significant number of regional networks 103a-b coupled to backbone network 101.

According to some embodiments, border routers of backbone network (e.g., border routers 105a and 105b) may provide data connectivity between backbone network 101 and respective regional networks (e.g., regional networks 103a and 103b). According to the OSPF routing protocol, an OSPF Link State Advertisement (LSA) notification (also referred to as an OSPF LSA, a Link State Advertisement, and LSA notification, or an OSPF LSA notification) may be transmitted among routers of regional networks 103a and 103b to advertise the addition/availability of a new router (e.g., provider edge router 114a, 114b, 114c, 114d, etc.) to one of the regional networks or to advertise the removal/unavailability of a previously available router (e.g., provider edge router 114a, 114b, 114c, 114d, etc.) from one of the regional networks. Each Link State Advertisement (LSA) notification includes address information (e.g., a LoopBack or LB) for the respective router that is being added to or removed from a regional network.

Because an OSPF Link State Advertisement notification generated in one regional network should be propagated through all regional networks, information for each Link State Advertisement notification should be transferred through backbone network 101 so that Link State databases of all interfaces of all routers of the regional networks may be kept current. To reduce burden on backbone network 101, information for an OSPF Link State Advertisement notification may be received at one border router (e.g., border router 105a), redistributed to another routing protocol (e.g., BGP routing protocol), and transferred to the other border routers (105b and 105c) of the backbone network 101. These other border routers (e.g., 105b and 105c) may then redistribute the address information to generate new Link State Advertisement (LSA) notifications that are transmitted to respective regional networks (e.g., regional network 103b).

More particularly, border router 105a may be configured to receive a notification of a change in status of an edge router (e.g., edge router 114a) of regional network 103a, and the notification may be received as an OSPF Link State Advertisement (LSA) notification including address information (e.g., a LoopBack address or LB address) identifying a router of regional network 103a for which a status has changed. The notification may thus be received at border router 105a according to a first routing protocol, such as the OSPF routing protocol. Border router 105a may be further configured to redistribute the notification of the change in status of edge router 114a from the first routing protocol (e.g., the OSPF routing protocol) to a second routing protocol (e.g., the Border Gateway Protocol or BGP routing protocol) with the first and second routing protocols being different. Moreover, border router 105b may provide data connectivity between backbone network 101 and another regional network 103b, and route reflector 107 may be configured to transfer the redistributed notification from border router 105a to border router 105b according to the second routing protocol (e.g., BGP routing protocol). The BGP routing protocol is discussed, for example, by Y. Rkhter et al. in "RFC1771—A Border Gateway Protocol 4 (BGP-4)," Request For Comments 1771, pages 1-51, March 1995, the disclosure of which is hereby incorporated herein in its entirety by reference.

Once the redistributed notification has been transferred to border router 105b, border router 105b may be configured to redistribute the redistributed notification from the second routing protocol (e.g., BGP routing protocol) back to the first routing protocol (e.g., the OSPF routing protocol). Border router 105b may then transmit the notification to regional network 103b as a Link State Advertisement (LSA) notification according to the first routing protocol (e.g., the OPSF routing protocol). Accordingly, Link State Advertisement notifications may be propagated throughout numerous regional networks without requiring support of the OSPF routing protocol at internal interfaces of border routers 105a-c of backbone network 101 for every Link State Advertisement notification received from regional networks 103a-b.

Figure 2:
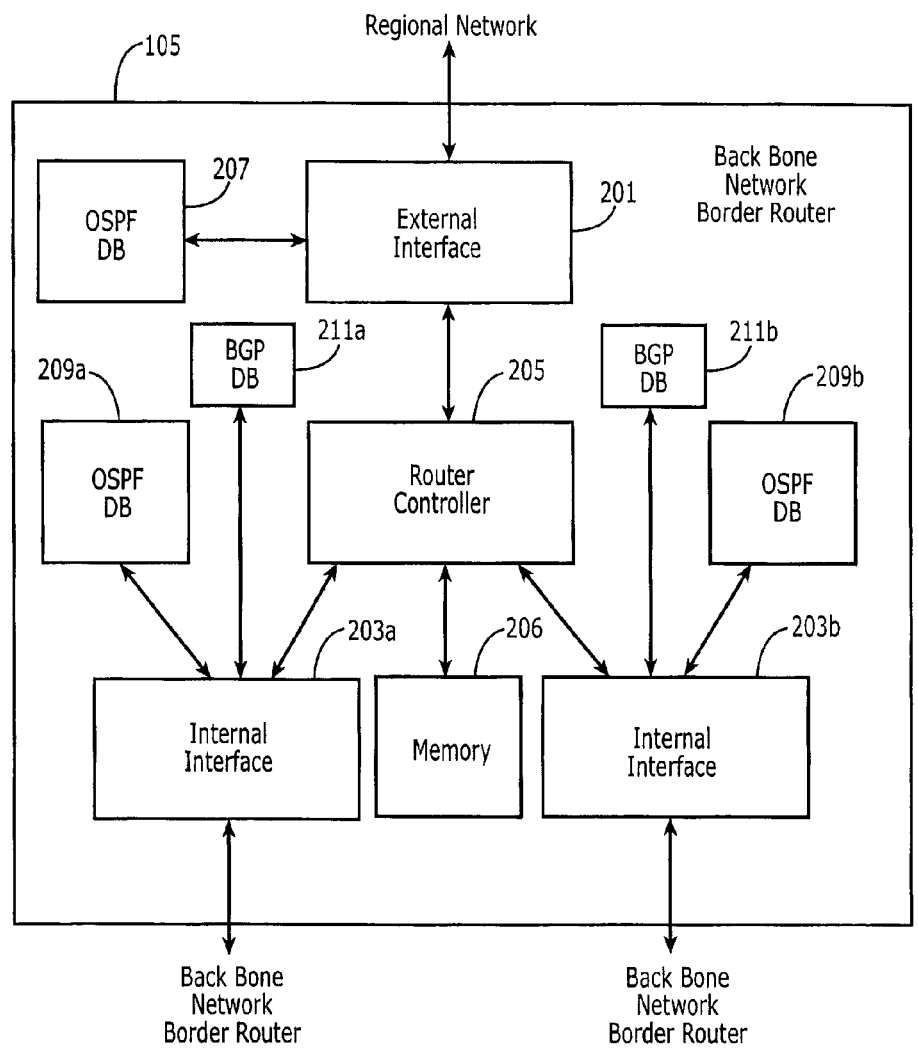
FIG. 2 is a block diagram illustrating embodiments of a border router used in a backbone network providing redistribution.

An example of a border router 105 of backbone network 101 will now be discussed in greater detail with respect to the block diagram of FIG. 2. Structures and operations of border router 105 discussed below may be separately implemented at each of border routers 105a-c shown in FIG. 1. As shown, backbone network border router 105 may include external interface 201 configured to provide data coupling with a border router of a respective regional network, and a plurality of internal interfaces 203a and 203b configured to provide data coupling with other border routers of backbone network 101. Moreover, a router controller 205 may provide interconnections between and control of external and internal interfaces 201, 203a, and 203b. In addition, memory 206 may include a computer-readable storage medium including computer-readable program code configured to provide instructions used by controller 205 to operate border router 105 as discussed in greater detail, for example, below with respect to FIGS. 3-5. Respective OSPF Link State (LS) databases 207, 209a, and 209b may be provided for the external and internal interfaces 201, 203a, and 203b, and BGP databases 211a and 211b may be provided for internal interfaces 203a and 203b.

Operations of border router 105 of FIG. 2 will now be discussed with reference to border router 105a of FIG. 1. Accordingly, external interface 201 will be discussed as providing data coupling to border router 111a of regional network 103a, internal interface 203a will be discussed as providing data coupling to border router 105c of backbone network 101, and internal interface 203b will be discussed as providing data coupling to border router 105b of backbone network 101. It will be understood that the structure of FIG. 2 could separately be provided for border routers 105b and 105c.

As discussed above, an OSPF Link State Advertisement (LSA) notification may be generated within regional network 103a as a notification that a status of a provider edge router (e.g., PER 114a or 114b) within regional network 103a has changed. More particularly, an OSPF LSA notification may be generated responsive to adding a provider edge router to regional network 103a or removing a provider edge router 103a from the regional network 103a, and the OSPF LSA notification may include address information (e.g., a LoopBack or LB address) identifying the router with the changed status. Once an OSPF LSA notification has been generated within regional network 103a, border router 111a of regional network 103a may transmit the OSPF LSA notification to border router 105a of backbone network 101.

The OSPF LSA notification transmitted by router 105a may be received at external interface 201 of border router 105a of backbone network 101 according to the OSPF routing protocol. External interface 201 may be configured to update OSPF LS database 207 based on the change in status identified in the received OSPF LSA. More particularly, OSPF LS database 207 may be updated to reflect the change in status of the provider edge router of regional network 103a identified in the received OSPF LSA. In addition, router controller 205 may be configured to redistribute information of the OSPF LSA notification from the OSPF routing protocol to the BPG routing protocol, and the router controller 205 may be configured to provide the redistributed notification in the BGP routing protocol to internal router interfaces 203a and 203b. Internal router interfaces 203a and 203b may be configured to transmit the redistributed notification in the BGP routing protocol to other border routers 105b and 105c of the backbone network 101 responsive to receiving the redistributed notification at internal interfaces 203a and 203b. By redistributing information of the OSPF LSA notification to the BGP routing protocol, OSPF LSA notifications from one regional network may be propagated through the backbone network to other regional networks without requiring that the backbone network support internal transmission of OSPF communications for every OSPF LSA notification received at a border router of the backbone network.

By redistributing an OSPF LSA notification into the BGP routing protocol for internal distribution within backbone network 101, OSPF databases 209a and 209b for internal interfaces 203a and 203b may be maintained differently than OSPF database 207 for external interface 201. More particularly, OSPF LS database 207 for external interface 201 may be maintained to reflect the current status of provider edge routers of regional networks 103a-b outside backbone network 101, while OSPF LS databases 209a and 209b for internal interfaces 203a and 203b may be maintained without information relating to provider edge routers of regional networks outside backbone network. A burden of maintaining complete OSPF LS databases for internal interfaces of border routers of backbone network 101 may thus be reduced. Border Gateway Protocol (BGP) databases 211a and 211b associated with external router interfaces 203a and 203b, however, may be updated based on changes in status of provider edge routers of regional networks responsive to the redistributed notification.

Once internal interfaces 203a and 203b of border router 105a receive the redistributed notification according to the BGP routing protocol, the redistributed notification may be transferred through routing reflector 107 to internal interfaces of other border routers 105b and 105c of backbone network 101. Once the redistributed notification is received at an internal interface of border router 105b, for example, the router controller of border router 105b may be configured to redistribute the redistributed notification from the BGP routing protocol back to an OSPF LSA notification, and to provide the OSPF LSA notification to an external interface of border router 105b for transmission to regional network 103b. Moreover, an OSPF LS database for the external interface of border router 105b may be updated based on the OSPF LSA notification without updating OSPF LS databases of internal interfaces of border router 105b. OSPF LSA notifications may thus be propagated across multiple regional networks without requiring propagation of OSPF LSA notifications through the backbone network, and without requiring updates of OSPF databases for internal interfaces of backbone border routers for every OSPF LSA notification generated outside of the backbone network.

Figure 3:
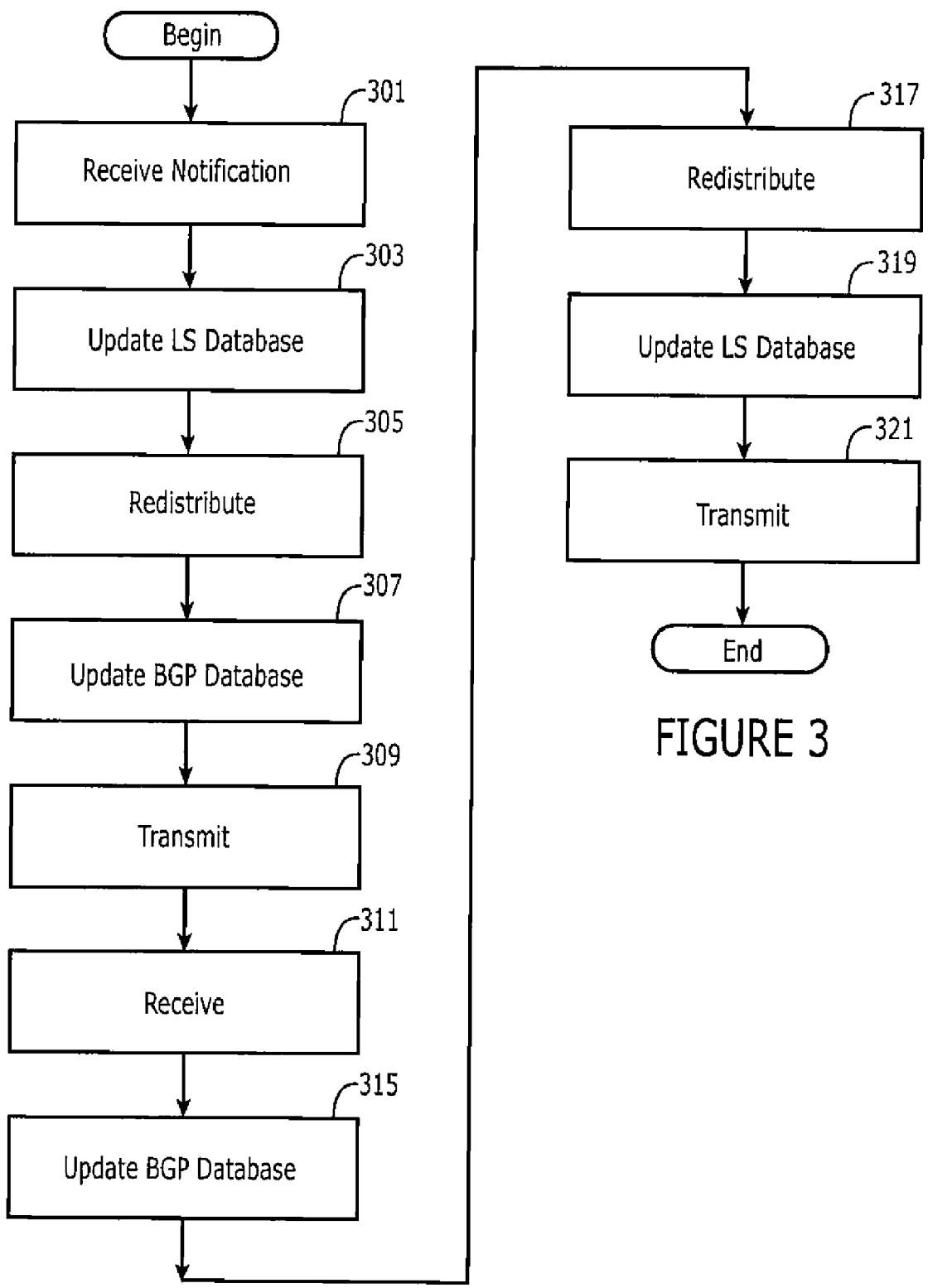
FIG. 3 is a flow chart illustrating operations of a backbone network providing redistribution.

Examples of methods of operating backbone network 101 will now be discussed with reference to the flow chart of FIG. 3. Regional network 103a may generate a notification of a change in status of an edge router (e.g., PER 114a, 114b, etc.). More particularly, the notification may be generated responsive to adding an edge router to regional network 103a or removing an edge router from regional network 103a. Moreover, the notification may be an OSPF Link State Advertisement (LSA) notification that is transmitted from border router 111a of regional network 103a to border router 105a of backbone network 101, and the OSPF LSA notification may include an OSPF LoopBack (LB) address identifying the edge router for which the status has changed. At block 301, border router 105a of backbone network 101 may receive the notification (e.g., OSPF LSA) according to the OSPF routing protocol at an external interface.

Responsive to receiving the notification of the change in status of the edge router of regional network 103a, border router 105a may update a database (e.g., an OSPF LS database) associated with the external interface thereof at block 303, and redistribute the notification (e.g., the OSPF LSA notification) from the OSPF routing protocol to the BGP routing protocol at block 30. In addition, border router 105a may update a BPG database associated with an internal interface thereof based on the change in status of the edge router of regional network 103a at block 307, and the redistributed notification (e.g., a BGP notification) may be transmitted from the internal interface of border router 105a to another border router 105b of backbone network 101 at block 309. Moreover, the OSPF LS database of the external interface may be updated, the BGP database of the internal interface may be updated, and the redistributed notification may be transmitted without updating any OSPF LS database associated with the internal interface.

The redistributed notification may then be received at an internal interface of border router 105b of backbone network 101 at block 311, and a BGP database associated with the internal interface of border router 105b may be updated based on the notification at block 315. At block 317, the notification may be redistributed from the BGP routing protocol to the OSPF routing protocol, and at block 319, an OSPF LS database associated with an external interface of border router 105b may be updated. At block 321, the notification (e.g., an OSPF LSA notification) may be transmitted from the external interface of border router 105b to regional network 103b.

Accordingly, the OSPF LSA notification generated at regional network 103a may be transmitted to regional network 103b without requiring updates of OSPF LS databases associated with internal interfaces of border routers (e.g., border routers 105a, 105b, 105c, etc.) of backbone network 101. While distribution of a notification from regional network 103a to regional network 103b is discussed by way of example, a notification may be distributed in the opposite direction with operations discussed above with respect to border routers 105a and 105b being reversed so that an OSPF LSA notification originating at regional network 103b may be distributed through backbone network 101 to regional network 103a. Moreover, distribution between two regional networks has been discussed by way of example, but it will be understood that an OSPF LSA notification generated by one regional network coupled to backbone network 101 may be distributed to any number of regional networks coupled to backbone network.

Figure 4:
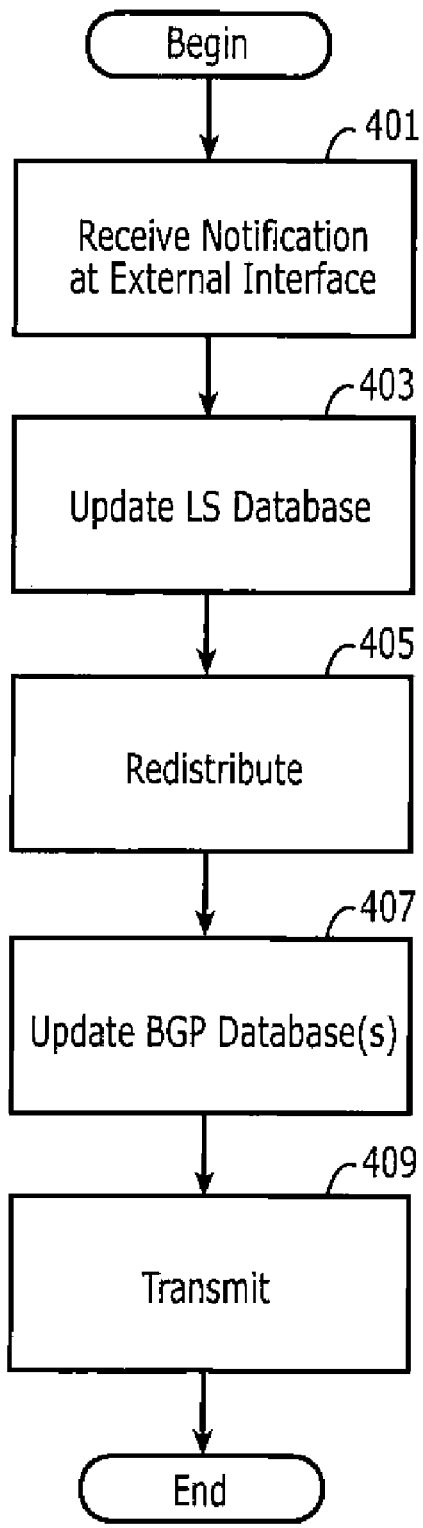
FIGS. 4 and 5 are flow charts illustrating operations of a border router of a backbone network providing redistribution.

Additional examples of methods of operating border router 105 of a backbone network 101 will now be discussed with reference to the flow chart of FIG. 4. At block 401, border router 105 may receive a notification of a change in status of an edge router (e.g., an OSPF LSA notification) at external interface 201 that is coupled to a border router (e.g., border router 111a of FIG. 1) of a regional network (e.g., regional network 103a). More particularly, the OSPF LSA notification may relate to a change in status of an edge router of the regional network (e.g., regional network 103a) coupled to backbone network 101 through the border router 105.

Responsive to receiving the OSPF notification of the change in status of the edge router of the regional network, border router 105 may update OSPF LS database 207 associated with external interface 201 of border router 105 at block 403. Responsive to receiving the OSPF LSA notification of the change in status of the edge router, router controller 205 may redistribute the notification of the change in status of the edge router from OSPF routing protocol to the BGP routing protocol at block 405.

At block 407, BGP databases 209a and 209b associated with internal interface 203a and 203b of router 105 may be updated responsive to receiving and redistributing the OSPF LSA notification. At block 409, the redistributed notification may be transmitted according to the BGP routing protocol from internal interfaces 203a and 203b to other border routers (e.g., border routers 105b and 105c) of the backbone network 101. Moreover, OSPF LS database 207 associated with external interface 201 may be updated, BGP databases 211a and 211b of internal interfaces 203a and 203b may be updated, and the redistributed notification may be transmitted from internal interfaces 203a and 203b without updating OSPF LS databases 209a and 209b associated with internal interface 203a and 203b.

Figure 5:
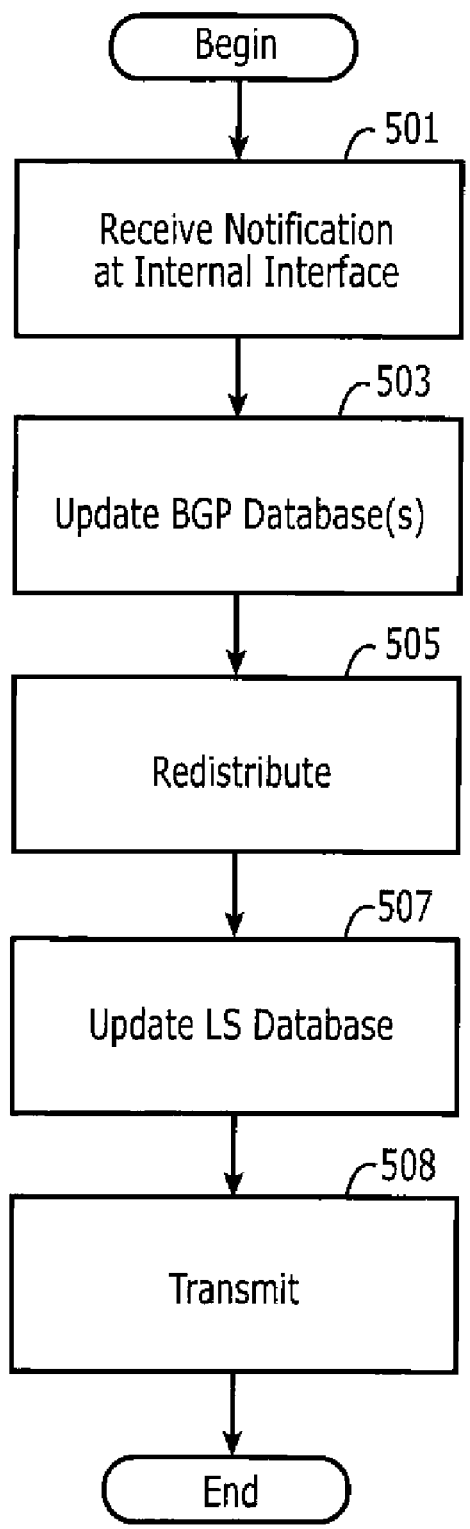

Additional examples of methods of operating border router 105 of a backbone network 101 will now be discussed with reference to the flow chart of FIG. 5. At block 501, border router 105 may receiving a notification of a change in status of an edge router (e.g., a BGP notification) at internal interface 203a and/or 203b that is coupled to another border router (e.g., border router 105b or 105c of FIG. 1) of backbone network 101. More particularly, the BGP notification may relate to a change in status of an edge router of a regional network (e.g., regional network 103b) coupled to backbone network 101 through another border router of backbone network (other than border router 105). Stated in other words, the BGP notification may be received from another border router of the backbone network.

Responsive to receiving the BGP notification of the change in status of the edge router of the regional network, border router 105 may update BGP database(s) 211a and/or 211b associated with internal interfaces 203a and/or 203b of border router 105 at block 503. Responsive to receiving the BGP notification of the change in status of the edge router, router controller 205 may redistribute the notification of the change in status of the edge router from BGP routing protocol to the OSPF routing protocol at block 505.

At block 507, OSPF LS database 207 associated with external interface 201 of router 105 may be updated responsive to receiving and redistributing the BPG notification. At block 509, the redistributed notification may be transmitted according to the OSPF routing protocol (e.g., as an OSPF LSA notification) from external interface 201 to a border router (e.g., border router 111a) of a regional network (e.g., regional network 103a) coupled to border router 105. Moreover, OSPF LS database 207 associated with external interface 201 may be updated, BGP databases 211a and 211b of internal interfaces 203a and 203b may be updated, and the redistributed notification may be transmitted from external interface 201 without updating OSPF LS databases 209a and 209b associated with internal interface 203a and 203b.

While operations of propagating LSA notifications from regional network 103a to regional network 103b have been discussed above by way of example, the same operations/structures may be applied to propagate LSA notifications in the opposite direction from regional network 103b to regional network 103a. Accordingly, operations/structures discussed above with respect to border router 105a may be applied to border router 105b, and operations/structures discussed above with respect to border router 105b may be applied to border router 105a.

There have been disclosed embodiments in the drawings and specification. However, many variations and modifications can be made to these embodiments without departing from the principles disclosed herein. All such variations and modifications are intended to be included herein within the scope of this disclosure, as set forth in the following claims. While particular arrangements of routers, networks, network elements, etc. and paths therebetween are discussed by way of example with respect to FIG. 1, embodiments may be implemented, for example, using other arrangements and/or numbers of elements and/or different paths therebetween.

That which is claimed is:

1. A backbone network comprising:
   a first border router providing data connectivity between the backbone network and a first regional network wherein the first border router is configured to receive a notification of a change in status of an edge router of the first regional network wherein the notification is received according to a first routing protocol, and to redistribute the notification of the change in status of the edge router from the first routing protocol to a second routing protocol wherein the first and second routing protocols are different;
   a second border router providing data connectivity between the backbone network and a second regional network; and
   a route reflector coupled between the first and second border routers wherein the route reflector is configured to transfer the redistributed notification from the first border router to the second border router,
   wherein the first border router comprises:
      a first OSPF Link State database associated with a first router interface,
      wherein the first OSPF Link State database is provided according to the first routing protocol, and wherein the first router interface is configured to update the interface based on the change in status of the edge router responsive to receiving the notification of the change in status of the edge router of the regional network;
      a second OSPF Link State database associated with a second router interface, and wherein the first router interface is configured to update the first OSPF Link State database based on the change in status of the edge router without the second interface updating the second OSPF Link State database based on the change in status of the edge router; and
      a Border Gateway Protocol database associated with the second router interface wherein the second router interface is configured to update the BGP database based on the change in status of the edge router responsive to the second router interface receiving the redistributed notification.

2. A backbone network according to claim 1 wherein the second border router is configured to redistribute the redistributed notification from the second routing protocol back to the first routing protocol responsive to receiving the redistributed notification, and to transmit the notification to the second regional network according to the first routing protocol.

3. A backbone network according to claim 1 wherein the first border router includes the first router interface coupled to the first regional network, a second router interface coupled to the second border router, and a database associated with the first router interface and provided according to the first routing protocol, and wherein the first border router is configured to update the database based on the change in status of the edge router.

4. A backbone network according to claim 3 wherein the first routing protocol comprises an Open Shortest Path First (OSPF) routing protocol and the second routing protocol comprises a Border Gateway Protocol (BGP) routing protocol.

5. A backbone network according to claim 4 wherein the database associated with the first router interface of the first border router comprises a first OSPF Link State (LS) database, wherein the first border router includes a second OSPF Link State (LS) database associated with a second interface coupled to the second border router, and wherein updating the first OSPF Link State database comprises updating the first OSPF Link State database based on the change in status of the edge router without updating the second OSPF Link State database based on the change in status of the edge router.

6. A backbone network according to claim 4 wherein the database associated with the first router interface of the first border router comprises an OSPF Link State database, and, wherein the first border router is configured to update the BGP database based on the change in status of the edge router in response to receiving the notification of the change in status of the edge router.

7. A backbone network according to claim 4 wherein the notification of the change in status of the edge router comprises an OSPF Link State Advertisement (LSA) notification generated responsive to adding an edge router to the regional network.

8. A backbone network according to claim 4 wherein the notification of the change in status of the edge router comprises an OSPF Link State Advertisement (LSA) notification generated responsive to removing an edge router from the regional network.

9. A backbone network according to claim 1 wherein the notification of the change in status of the edge router comprises an OSPF Link State Advertisement (LSA) notification including an OSPF LoopBack (LB) address identifying the edge router.

10. A backbone network according to claim 1 wherein the second border router is configured to receive a second notification of a change in status of a second edge router of the second regional network wherein the second notification is received according to the first routing protocol, to redistribute the second notification of the change in status of the second edge router from the first routing protocol to the second routing protocol, and wherein the router reflector is configured to transfer the second redistributed notification from the second border router to the first border router.

11. A border router of a backbone network, the border router comprising:

a first router interface providing a data coupling with a regional data network outside the backbone network wherein the first network interface is configured to receive a notification of a change in status of an edge router of the regional network wherein the notification is received according to a first routing protocol;

a first OSPF Link State database associated with the first router interface wherein the first OSPF Link State database is provided according to the first routing protocol, and wherein the first router interface is configured to update the interface based on the change in status of the edge router responsive to receiving the notification of the change in status of the edge router of the regional network;

a second router interface providing a data coupling with another border router of the backbone network;

a router controller coupled to the first and second router interfaces wherein the router controller is configured to redistribute the notification of the change in status of the edge router from the first routing protocol to a second routing protocol wherein the first and second routing protocols are different, and wherein the router controller is configured to provide the redistributed notification to the second router interface;

a second OSPF Link State database associated with the second router interface, and wherein the first router interface is configured to update the first OSPF Link State database based on the change in status of the edge router without the second interface updating the second OSPF Link State database based on the change in status of the edge router; and a Border Gateway Protocol database associated with the second router interface wherein the second router interface is configured to update the BGP database based on the change in status of the edge router responsive to the second router interface receiving the redistributed notification.

12. A border router according to claim 11 wherein the second router interface is configured to transmit the redistributed notification in the second routing protocol to another border router of the backbone network responsive to receiving the redistributed notification at the second router interface.

13. A border router according to claim 11 wherein the first routing protocol comprises an Open Shortest Path First (OSPF) routing protocol and the second routing protocol comprises a Border Gateway Protocol (BGP) routing protocol.

14. A border router according to claim 13 wherein the notification of the change in status of the edge router comprises an OSPF Link State Advertisement (LSA) notification generated responsive to adding an edge router to the regional network.

15. A border router according to claim 13 wherein the notification of the change in status of the edge router comprises an OSPF Link State Advertisement (LSA) notification generated responsive to removing an edge router from the regional network.

16. A border router according to claim 11 wherein the notification of the change in status of the edge router comprises an OSPF Link State Advertisement (LSA) notification including an OSPF LoopBack (LB) address identifying the edge router.

17. A border router according to claim 11 wherein the second interface is configured to receive a second notification of a change in status of a second edge router of a second regional network wherein the second notification is received according to the second routing protocol, wherein the router controller is configured to redistribute the second notification of the change in status of the second edge router from the second routing protocol to the first routing protocol and to provide the redistributed second notification to the first router interface, and wherein the first router interface is configured to update the database based on the redistributed second notification.

18. A method of operating a border router of a backbone network providing data connectivity between the backbone network and a regional network, the method comprising:

receiving a notification of a change in status of an edge router of the regional network at an interface of the border router of the backbone network that is coupled to the regional network wherein the notification is received according to a first routing protocol;

responsive to receiving the notification of the change in status of the edge router of the regional network, updating a database associated with the interface of the border router coupled to the regional network wherein the database is provided according to the first routing protocol wherein the database is updated based on the change in status of the edge router;

responsive to receiving the notification of the change in status of the edge router of the regional network, redistributing the notification of the change in status of the edge router from the first routing protocol to a second routing protocol wherein the first and second routing protocols are different;

updating, based on the change in status of the edge router responsive to receiving the notification of the change in status of the edge router of the regional network, a first OSPL Link State database associated with a first router interface, wherein the database is provided according to the first routing protocol, and wherein the first router interface is configured to update the interface, not updating a second OSPF Link State (LS) database associated with a second router interface, and wherein the first router interface is configured to update the first OSPF Link State database based on the change in status of the edge router without the second interface updating the second OSPF Link State database based on the change in status of the edge router; and updating a Border Gateway Protocol (BGP) database associated with the second router interface wherein the second router interface is configured to update the BGP database based on the change in status of the edge router responsive to the second router interface receiving the redistributed notification.

* * * * *